Dec. 10, 1968
S. D. RAEZER
3,416,021
ARC APPARATUS EMPLOYING THREE DIMENSIONAL
ARC MOTION AND DYNAMIC BALANCING
Filed May 11, 1966
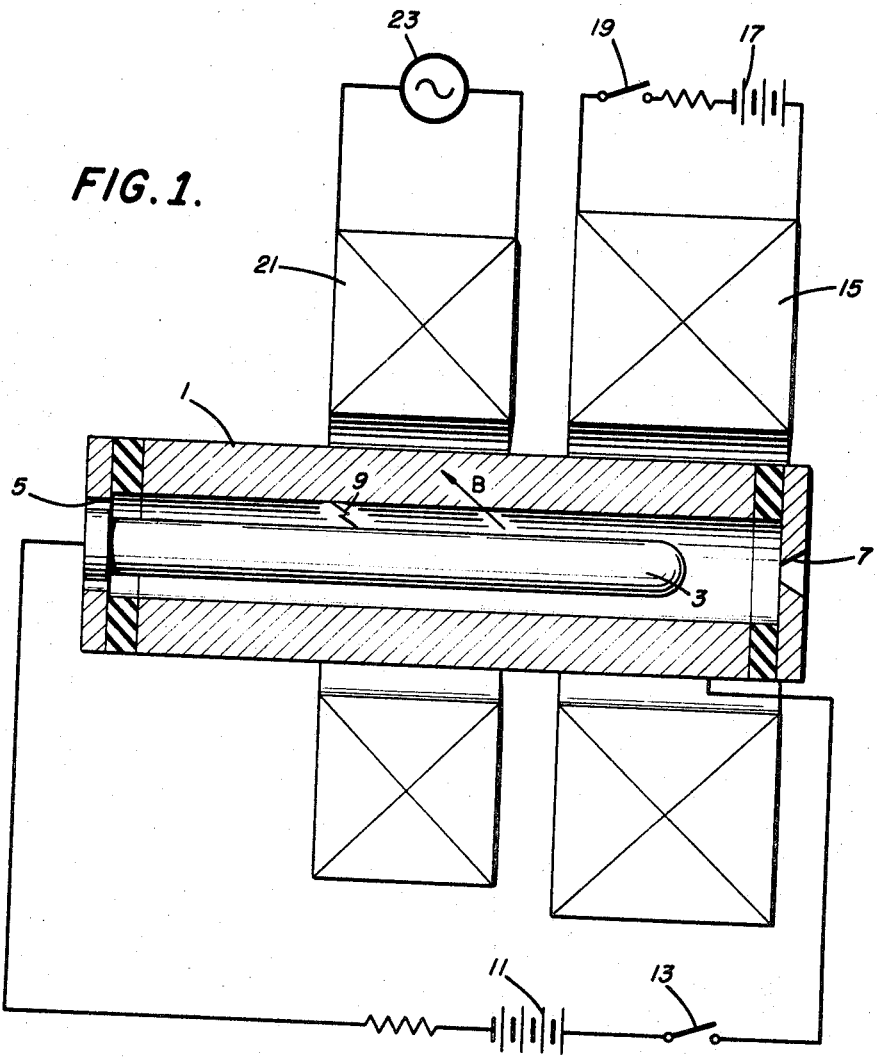
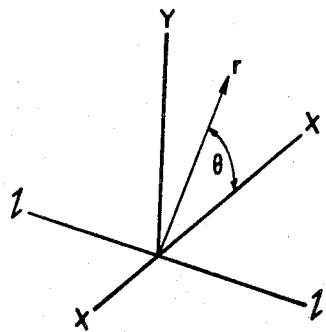
SPENCER D. RAEZER
INVENTOR
BY
ATTORNEY United States Patent Office 3,416,021
Patented Dec. 10, 1968

3,416,021
ARC APPARATUS EMPLOYING THREE DIMENSIONAL ARC MOTION AND DYNAMIC BALANCING
Spencer D. Raezer, Rockville, Md., assignor to the United States of America as represented by the Secretary of the Navy
Filed May 11, 1966, Ser. No. 550,087
6 Claims. (Cl. 313—161)

ABSTRACT OF THE DISCLOSURE

The present invention relates to arc heater apparatus comprising a pair of concentric, cylindrical electrodes which support a D.C. arc therebetween for the purpose of heating input gas applied to the arc chamber. A D.C. coil encircles the electrodes and creates a magnetic field which causes the arc to rotate between the concentric electrodes at a position along the length of the electrodes where the arc is stabilized or dynamically balanced with the drag force encountered in operation. An A.C. field coil is also provided and alternately weakens and strengthens the D.C. field in such a manner that the arc will move up and down the length of the electrodes, while it rotates, thus utilizing a greater portion of the electrode surface and thereby reducing the so-called arc root heat flux at any fixed point on the electrode surface. At the same time, the drag force will always be balanced by the resultant magnetic field and the tendency of the arc to blow out is minimized.

---

This invention relates generally to plasma arcs and more particularly to an improved dynamically balanced arc in three-dimensional rotation.

In plasma arcs, where the power may run from tens of thousands to millions of watts, electrode erosion is a major problem. Graphite electrodes have been used quite commonly, but they rapidly sublime and oxidize, so that the gas becomes heavily contaminated and running times becomes quite short unless the electrodes are continuously fed to the arc. In many applications, contamination must be minimized, and in the case of high pressure arcs it is mechanically difficult to use an electrode feed system. Accordingly, it has been found advantageous to use water cooled metal electrodes.

When a hot gas is in contact with a cooler surface, the heat flux to the wall is some function of the temperature difference between the gas and the surface. If this heat flux is not balanced by a corresponding flux to the coolant on the other side of the wall, then the wall temperature rises. Ultimately, melting and vaporization occur and the wall is destroyed.

A step forward was made early in plasma arc technology when tangential gas entry-ports were used to rotate the gas and the arc along with it, thus increasing the effective arc spot area and dissipating the power over a larger surface. The arc rotation rate (with this tangential gas system) depends upon the velocity with which the gas may be passed over the arc. Consequently, this method is not thoroughly effective with high chamber pressures and low gas velocity.

Present high power plasma arcs employ two dimensional movement of the arc root to reduce the severity of electrode heating at the attachment point. The optimum power magnification that results by this principle, at infinite arc velocity, is equal to the ratio of electrode perimeter to arc root diameter. On the other hand, if the arc is rotated in three dimensions, the optimum power magnification becomes the ratio of electrode surface to arc root area. This results in a large reduction of overall dimensions for a given power input, with the additional gain of high efficiency.

One of the major drawbacks to the use of the plasma arc as an air heater is that the moving air tends to drag and elongate the arc column, resulting in instability or extinction of the arc. This tendency may be overcome by the proper application of a magnetic field. The instant invention combines the two principles of three dimensional movement and dynamic balance of magnetic and drag forces ot preduce a stable and high power plasma arc unit of small size and high efficiency.

It is another object of the present invention to provide a high power plasma arc having dynamic balance of magnetic and drag forces.

Accordingly, it's an object of this invention to provide a plasma arc for use as a gas heater wherein the arc produced is stable and not subject to extinction.

It is another object of the present invention to provide a high power plasma arc having dynamic balance of magnetic and drag forces.

Another object of the instant invention is to provide a plasma arc wherein the optimum power magnification is equal to the ratio of electrode surface to arc root area.

Still another object of the present invention is to provide a high power plasma arc employing three dimensional rotation of the arc.

A further object of this invention is to produce a stable high power plasma arc unit of small size and high efficiency.

A still further object of the present invention is to provide a stable high power plasma arc unit of small size and high efficiency which combines three dimensional movement of the arc and dynamic balance of magnetic and drag forces.

The attendant advantages of this invention will be better appreciated and said invention will become clearly understood by reference to the following detailed description when considered in conjunction with the accompanying drawings, illustrating one embodiment of the instant invention, wherein:

FIG. 1 is a diagrammatic view of the instant invention, partly in section; and

FIG. 2 is a graphical view of some of the vector directions present in the invention of FIG. 1.

Referring to the drawings in more detail, and more particularly to FIG. 1, the invention is seen to comprise a cylindrical outer electrode 1 and a cylindrical inner electrode 3 concentric therewith. Commonly, the outer and inner electrodes 1 and 3, respectively, are water cooled (not shown) in a well-known manner. Gas is supplied, e.g., air, to the interior space between said electrodes 1 and 3 through an orifice 5, and is evacuated from said interior space through a nozzle 7. An arc 9 may be created between said electrodes 1 and 3 by means of a source of D.C. potential 11 which is serially connected through a switch 13 to said electrodes 1 and 3.

A D.C. coil 15 is mounted outwardly of one end portion of said electrode 1 and is concentric therewith. A D.C. signal is supplied to said coil 15 through a serially connected power supply 17 and a switch 19. An A.C. coil 21 is mounted outwardly of said electrode 1, concentrically therewith, and adjacent said D.C. coil 15. An A.C. signal is applied to said coil 21 by an A.C. signal source 23 connected thereto. When the switch 19 is closed a direct current will be sent through the coil 15 resulting in the creation of a D.C. field indicated vectorially at B.

The D.C. arc 9, which is struck between the inner and outer electrodes, is caused to rotate by the magnetic field B created by said D.C. coil 15. The arc 9, when struck in the region indicated, will tend to move backward in the direction counter to the flow of gas, driven by the resultant magnetic forces created by the two dimensional D.C. field and the rotation of the arc.

Perhaps the simplest way to describe the action of the magnetic field on the arc 9 is by the application of Fleming's left hand rule.

Referring again to FIG. 2, in the region of the arc 9, the Z component of the field is arbitrarily taken in to be negative and consequently the R component will be in the positive direction. The ion flow is taken to be in the positive R direction and the application of the rule gives the resultant force as acting in the negative $\theta$ direction (into the page in the upper Y–X plane). Again, using Fleming's rule, this angular ion drift, acting with the R component of the field, results in a force in the negative Z direction, which opposes the drag force originating from the positive flow of gas. At some point, the drag forces will balance the magnetic force and the arc 9 will remain in stationary in the axial direction, while rotating about the inner electrode 3.

If the alternating field of the A.C. coil 21 is now applied, it will alternately weaken and strengthen the D.C. field Z in such a manner that the arc 9 will wander axially up and down the electrode 3 while it rotates, utilizing a greater portion of the electrode surface. Accordingly, this will effect a reduction of the arc root heat flux at a fixed point on the electrode surface. At the same time, the drag force will always be balanced by the field, and the tendency of the arc to blow out will be minimized.

Once the dynamic balance of drag and magnetic forces has been achieved, any variation in the fields, current, or gas velocity will perturb the balance. A periodic variation in the magnetic field, as induced by a sinusoidally varrying current in the coil 21, will cause a periodic drift of the arc 9 back and forth in the Z direction about the null position. The vanishing small inertia of the arc 9 will result in its following these changes in the field with effectively zero phase difference.

It can readily be seen that many variations and modifications of the present invention are possible in the light of the aforementioned teachings, and it will be apparent to those skilled in the art that various changes and form and arrangement of components may be made to suit requirements without departing from the spirit and scope of the invention. It is therefore to be understood that within the scope of the appended claims the instant invention may be practised in a manner otherwise than is specifically described herein.

What is claimed is:
1. Arc apparatus comprising, in combination,
   first and second spaced, coaxial electrodes capable of supporing an arc therebetween,
   means for passing an input gas in the axial direction through the space between said first and second electrodes,
   means for generating forces capable of causing said arc to rotate around the space between said first and second electrodes at a dynamically stabilized axial position on said electrodes, and
   means for periodically varying said forces effective to cause said rotating arc to move back and forth axially along said electrodes.
2. The combination specified in claim 1 wherein said forces are magnetic.
3. The combination specified in claim 2 wherein,
   said means for generating said magnetic forces comprises a D.C. coil concentrically disposed about said first electrode, and
   said means for periodically varying said magnetic forces comprises an A.C. coil concentrically disposed about said first electrode adjacent said D.C. coil.
4. The combination specified in claim 1 wherein said first and second electrodes are elongated cylinders and said second electrode is mounted concentrically within said first electrode and spaced therefrom.
5. The combination specified in claim 1 wherein said gas passing means includes,
   an orifice for admitting gas between said first and second electrodes, and
   a nozzle for discharging gas from between said first and second electrodes.
6. The combination specified in claim 1 further including a source of D.C. potential connected between said first and second electrodes for establishing an arc therebetween.

References Cited

UNITED STATES PATENTS 3,073,984   1/1963   Eschenbach _____ 313—231

JAMES W. LAWRENCE, *Primary Examiner.*

R. JUDD, *Assistant Examiner.*

U.S. Cl. X.R.

315—111; 313—231, 154, 157; 219—75